R. CLARK.
SHEEP DIPPING MECHANISM.
APPLICATION FILED MAY 6, 1910.
1,033,986.
Patented July 30, 1912.
4 SHEETS—SHEET 3.
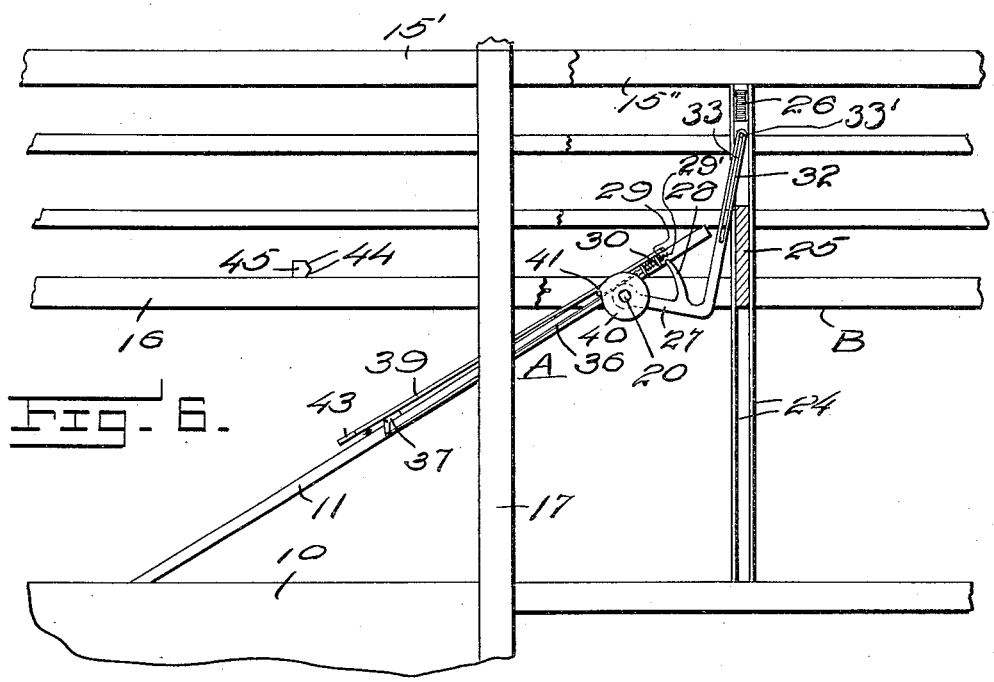
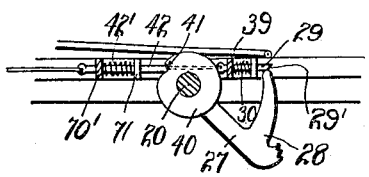
Witnesses
Inventor
Robert Clark,
By Woodward & Chandlee
Attorneys

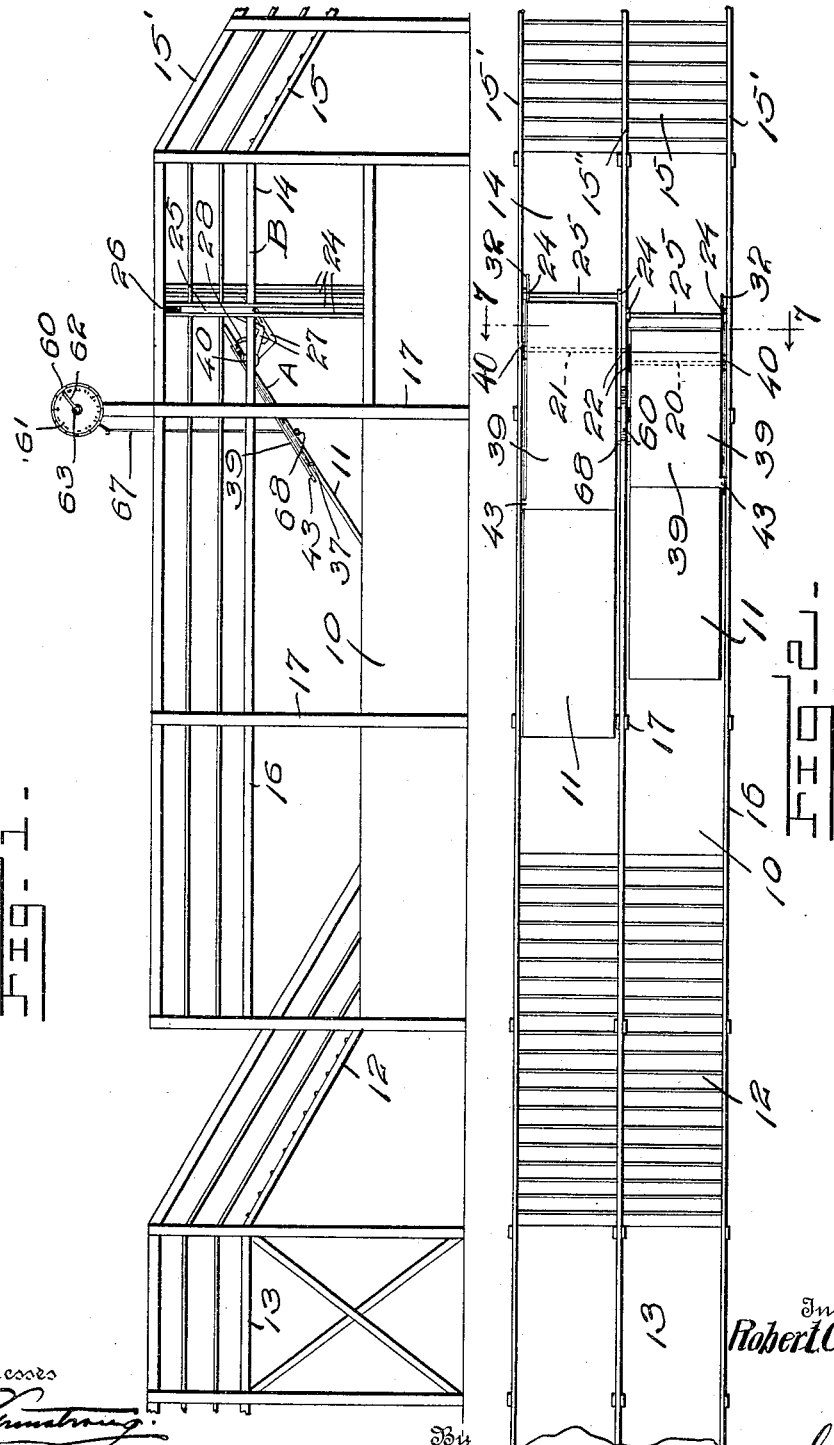

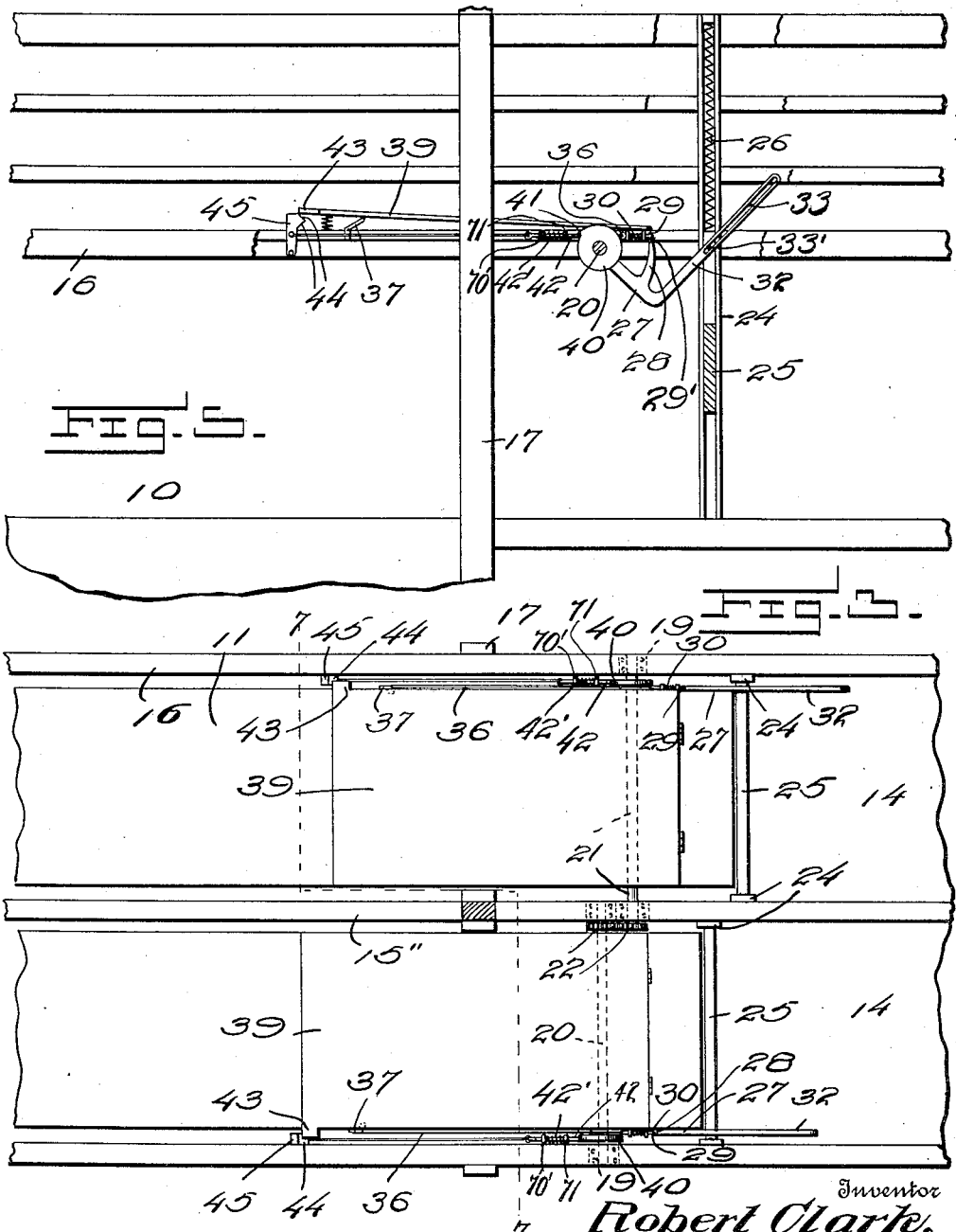

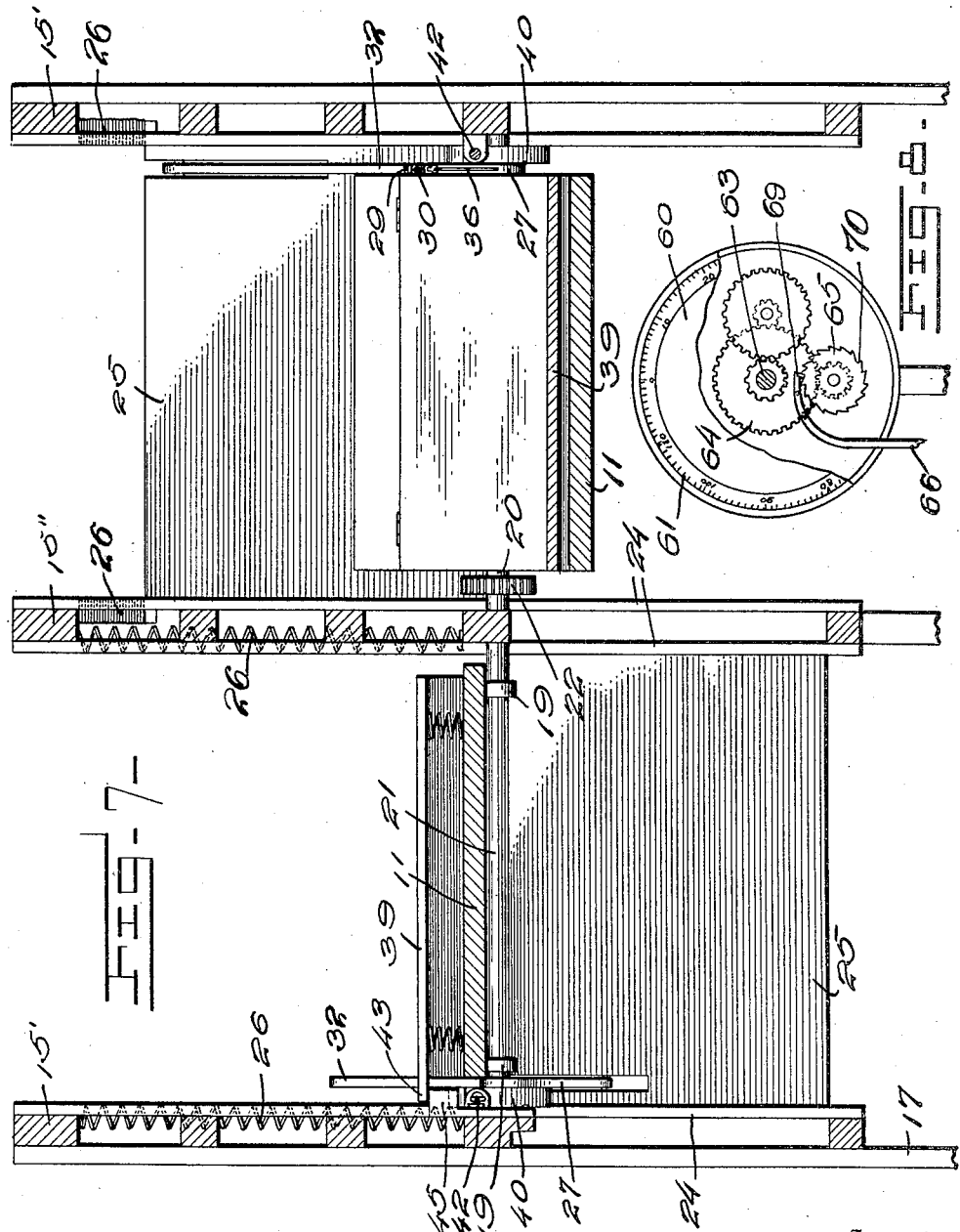

UNITED STATES PATENT OFFICE.

ROBERT CLARK, OF LEAVENWORTH, KANSAS.

SHEEP-DIPPING MECHANISM.

1,033,986.   Specification of Letters Patent.   Patented July 30, 1912.

Application filed May 6, 1910. Serial No. 559,715.

*To all whom it may concern:*

Be it known that I, ROBERT CLARK, a citizen of the United States, residing at Leavenworth, in the county of Leavenworth and State of Kansas, have invented certain new and useful Improvements in Sheep-Dipping Mechanism, of which the following is a specification.

This invention relates to sheep dipping apparatus, of the type in which a chute is used in connection with an elevated platform and a tank of treating liquid therebeneath, and traps arranged for animals to be driven upon and projected into the bath.

An object of the invention is to provide a trap having a tipple and a gate in front thereof, and connections between the two for automatically closing the gate before operation of the tipple, and opening the gate upon return of the tipple to operative position.

Another important object is to provide means operated by animals being treated by which the tipples are returned to initial position.

Another object is to provide a novel releasing mechanism for the tipple and gate.

Another object is to provide a novel form of mechanism for operating the gate.

Other objects and advantages will be apparent from the following description, and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side view of the apparatus, Fig. 2 is a top view thereof, Fig. 3 is a detail fragmentary top view of the trap, Fig. 4 is a detailed view of the gate operating mechanism, Fig. 5 is a detail side view of one of the tipples and gate, in initial position, Fig. 6 is a similar view in operated position, Fig. 7 is a cross sectional view on the line 7—7 of Fig. 3, Fig. 8 is a detailed view of the register.

Referring to the drawings, there is shown a dipping machine comprising the bath tank 10, leading into which is the slide 11, at one end and from which leads the escape way 12 at the opposite end, leading into the drain 13 at its upper end. The slide 11 leads from a tipple device A carried upon a suitable framework B, which may be of any suitable construction and includes a platform 14 from which leads the approach runway 15. The platform 14 is spaced a slight distance longitudinally from the tank 10, and the tipples 11 are pivoted adjacent thereto and leading over the tank, as shown.

The runway 15 is provided with a suitable fence or wall 15' at opposite sides, and a central partition fence or wall 15'', each of which are extended across the platform beyond the tipples and over the tank, as shown at 16, being supported by suitable uprights 17. Disposed at each side and centrally of the platform and projecting therefrom toward the tank, there are heavy brackets 19, and supported revolubly upon these are the revoluble shafts 20 and 21 extending transversely of the portions 16 which may be termed the tipple passages. It will be observed that the shaft 20 is set outwardly a spaced distance beyond the shaft 21, and each carry at their inner ends gears 22 of a common size and intermeshed. Secured upon these shafts are the tipple platforms 11, which project outwardly of the shafts a distance equal to four-fifths of their length or more. The tipples may be made of extremely light material upon their outer portions, as they are intended to yield to the weight of animals passing thereupon for rotation of the respective shafts to which they are attached, and lifting of the opposite tipple into initial position through the medium of the gears, the animal sliding from the tipple before its weight is fully supported upon the outer end portion of the tipple.

Between the inner ends of each tipple and the adjacent edge of the platform 14, there is a vertical guideway 24 extending downwardly, and slidable in each there is a gate member 25. The guideway projects upwardly above the platform, and secured to the gate there is a suitable spring 26, under tension to lift the gate into raised position above the platform. The spring may be replaced by a weight, if desired, or any other equivalent.

Loosely revoluble upon the shaft 20 outwardly of each tipple, there is a lever 27, having a projection 28 arranged to be engaged by a dog 29 slidable upon the side of the tipple and engaged by a suitable spring 30 to hold it in operative position. The lever 27 is formed with a slotted extension 32, in the slot 33 of which a pin 33', on the side of the gate, is adapted to ride in the upward and downward movement of said lever. It will be observed that the dog 29 is arranged to engage the projection 28 of the lever 27 to force the gate 25 into open position, as illustrated in Fig. 5. The dog 29 is arranged to be withdrawn from engaged position by means of a member 36, connected to the lower arm of a bell crank 37, the upper arm of which extends inwardly and is arranged to be engaged by the resiliently supported trigger board 39 pivoted adjacent the axis of the tipple and extending away from the gate. The trigger board is located a sufficient distance from the gate to be operated after the animal to be dipped has entirely passed the gate. Upon depression of the trigger board and operation of the dog 29, the gate will fly into closed position under action of the spring 26, lifting the lever 27 as shown in Fig. 6. When the tipple is operated to its fullest extent by the weight of an animal thereon, the dog 29 will come into contact with the projection 28 upon its under side, and being beveled as shown at 29' will yield to the pressure of the projection 28 allowing it to pass therebeyond for engagement of the projection and operation of the gate upon return of the tipple to its initial position.

Carried upon each of the shafts 20 and 21 outwardly of the levers 27, there are the check disks 40, having the shoulder 41 at one side engaging the spring pressed dog 42 which is carried by the member 16, by which the tipple is held firmly in initial position until operation of the trigger board. The trigger board is provided with a lateral projection 43 at its free end, which is arranged to engage the beveled faces 44 of the releasing lever 45 connected to the dog 42 for withdrawal of the dog and release of the tipple, as will be understood. A suitable spring 42' is disposed between a lug 70' on the member 16 and a collar 71 on the dog 42 to hold it normally in extended position, to engage the disk 40.

It will thus be seen that in operation, one of the tipples being disposed in initial position the gates down and the other being inclined and the gate up, animals may be allowed to enter the runways. Those entering the side adjacent the operated tipple will be prevented from entering thereon by the raised gate. Those on the opposite side will be free to enter the tipple, and it will be seen that as soon as one sheep has fully passed the gate, its fore feet will operate the trigger board, allowing the gate to fly upwardly behind the animal preventing the entrance of additional animals. As soon as the trigger board is depressed, the tipple will be released and inclined downwardly under the weight of the animal whereby it will be precipitated into the bath, rotating the gears 22 and returning the opposite tipple and gate to initial position, for the entrance of an animal thereon and operation in a similar manner. The tank 10 may be formed in any suitable manner, either excavated and lined with cement or built up of wood, metal or other suitable material. After the animals are precipitated into the bath in the tank, they are allowed to leave by the runway 12 extending oppositely from the tipples, and escape to the drain 13, the floors of which are properly inclined toward the runways 12, so that as much of the cleaning compound used in the bath may be saved as possible.

Disposed about the gates is a suitable counting mechanism 60, which comprises a suitable dial 61, over which there is movable a pointer 62 carried upon a concentric shaft 63 having a large pinion 64. This pinion is connected by a suitable train of gears to the ratchet wheel 65 in engagement of which there is the pivoted escapement lever 66, one end of which extends outwardly of the casing and is provided with a pendent link 67 carrying a cross head 68 projecting laterally beneath each of the tipples and arranged to be depressed by the operation of either. There is carried by the lever 66 a suitable operating member 69 arranged to engage a series of ratchet teeth 70 formed on the edge of the ratchet wheel 65, by which the gears are rotated in the counting mechanism.

What is claimed is:

1. An animal dipping machine comprising a tank, an approaching runway, and pivoted tipples interposed between the runway and the tank, gate members movable between the runway and the tipples, connections between the tipples and the gates for movement of the gates into closed position when the tipples are operated, connections between the tipples for return of either to initial position upon the operation of the other, an animal operated platform on each of the tipples, means on the runway for holding the tipples in elevated position, and connections between the platforms and the holding means, whereby when an animal stands on one of said platforms the holding means will be released and the tipple tilted.

2. A device of the class described comprising an approach runway and horizontally pivoted platforms adjacent thereto, intermeshed gears connected to said platforms for return of either to initial position upon operation of the other, a gate movable between the runway and platform, connections between the platform and the gate for operation of the gate upon operation of the platform, means for locking the platform in initial position, said means being adapted to be released by an animal after passing the gate.

3. A dipping device comprising two runways, a tipple platform pivoted transversely thereof, intermeshed gears connected between the two platforms for the return of either to initial position upon operation of the other, a notched member connected to the platforms, a stationary support, a dog carried thereby adapted to engage the notch to hold the platform in initial position, a resiliently supported trigger board carried upon the platform, and a dog releasing member adapted to be engaged by the trigger member upon depression thereof by an animal, to allow operation of the tipple platform, and independently operated gates adapted to be closed upon operation of the respective adjacent tipple.

In testimony whereof I affix my signature, in presence of two witnesses.

ROBERT CLARK.

Witnesses:
J. L. BRODRICK,
FRANK HAWKINS.